United States Patent [19]

Ebert et al.

[11] Patent Number: 4,953,834

[45] Date of Patent: Sep. 4, 1990

[54] PENDULUM WITH BENDING SPRING JOINT

[75] Inventors: Wolfram Ebert, Freiburg; Eberhard Handrich, Kirchzarten; Martin Hafen, Rottweil; Bruno Ryrko, Denslingen, all of Fed. Rep. of Germany

[73] Assignee: Litef GmbH, Freiburg im Breisgau, Fed. Rep. of Germany

[21] Appl. No.: 146,295

[22] Filed: Jan. 20, 1988

[30] Foreign Application Priority Data

Jan. 20, 1987 [EP] European Pat. Off. ........ 87100744.9

[51] Int. Cl.$^5$ ............................................. F16F 1/18
[52] U.S. Cl. .................................... 267/160; 156/647; 267/150; 267/158; 267/182
[58] Field of Search ............... 267/141, 182, 150, 158, 267/160; 156/643, 647, 662; 74/570

[56] References Cited

U.S. PATENT DOCUMENTS

| Re. 31,459 | 12/1983 | Block | 29/592.1 X |
|---|---|---|---|
| 3,543,301 | 11/1970 | Barnett | 74/5 F |
| 3,920,482 | 11/1975 | Russell | 156/643 X |
| 4,483,194 | 11/1984 | Rudolf | 73/517 B X |
| 4,522,893 | 6/1985 | Bohlen et al. | 357/26 X |
| 4,542,397 | 9/1985 | Biegelsen et al. | 156/657 X |
| 4,619,349 | 10/1986 | Braun | 267/160 X |
| 4,626,244 | 12/1986 | Reinicke | 604/151 X |
| 4,670,092 | 6/1987 | Motamedi | 156/643 |
| 4,685,996 | 8/1987 | Busta et al. | 156/647 X |
| 4,699,006 | 10/1987 | Boxenhorn | 73/517 AV |
| 4,700,817 | 10/1987 | Kondo et al. | 267/136 X |

FOREIGN PATENT DOCUMENTS 689387 4/1967 France .

OTHER PUBLICATIONS

"Silicon Micromechanical Devices", by James B. Angell, Stephen C. Terry and Phillip W. Barth; *Scientific American;* vol. 248, No. 4, pp. 44–55.

"IBM Technical Disclosure Bulletin", vol. 22, No. 12, May 1980; P. Geldermans and M. J. Palmer.

"IBM Technical Disclosure Bulletin", vol. 24, No. 6, Nov. 1981; R. S. Bennett and L. M. Ephrath.

Article: Kurt E. Petersen "Dynamic Micromechanics on Silicon: Techniques and Devices", *IEEE Transactions on Electron Devices,* vol. ED-25, No. 10, (Oct. 1978).

Article: Werner Kern, "Chemical Etching of Silicon, Germanium, Galldium Arsenide and Gallium Phosphide", *RCA Review,* vol. 39, No. 2, (Jun. 1978), pp. 278–308.

Article: Ernest Bassous, "Fabrication of Novel Three-Dimensional Microstructures by the Anisotropic Etching of (100) and (110) Silicon", *IEEE Transactions on Electron Devices,* vol. ED-25, No. 25, (Oct. 1978), pp. 1178–1185.

Article: D. Dieumegard, "Pulverisation et Technologies D'erosion Ionique", *La Vide, les Couches Minces,* vol. 35, No. 204, (Nov.-Dec. 1980), pp. 317–336.

*Primary Examiner*—Robert P. Olszewski
*Assistant Examiner*—Matthew C. Graham
*Attorney, Agent, or Firm*—Elliott N. Kramsky

[57] ABSTRACT

A micromechanical bending spring joint is formed of selectively etched wafer material. The joint includes a pair of leaf springs arranged alongside each other. Each spring is inclined at an oblique angle to the opposed surfaces of the wafer and such springs cross to define a point of intersection. The joint, selectively etched from a single wafer, is characterized by high precision of fulcrum position, bending spring constant and transverse axis rigidity.

4 Claims, 2 Drawing Sheets

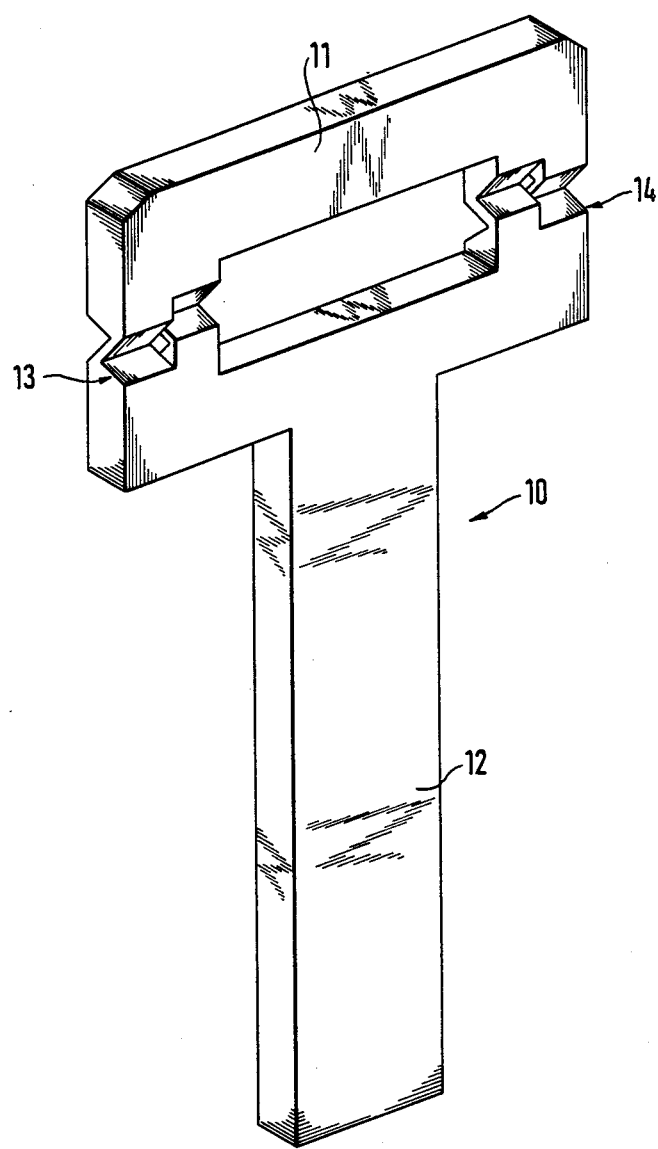

PENDULUM WITH BENDING SPRING JOINT

BACKGROUND

1. Field of the Invention

The present invention relates to joints formed of selectively etched silicon wafer material. More particularly, this invention pertains to such a joint, its method of manufacture and a pendulum incorporating at least one such joint and produced by micromechanical single-crystal etching.

2. Description of the Prior Art

Numerous applications, such as flexible suspensions for pendulums, require bending spring joints having a precisely located fulcrum and a well-defined spring constant. Such bending spring joints have been produced in the past from flat metal leaf springs formed from cold-rolled metal foils. The foils are welded by a laser welding process to form a composite layer structure to attain the required accuracy with regard to fulcrum and spring constant. Another technique has been to employ a milling process to form the bending spring element from metal strip material that is etched to the desired thickness by an electrolytic polishing process.

Production processes as described above are both complex and expensive. In the composite technique, difficulties arise from the multiple layer structure of the metal spring. Furthermore, metal is generally of insufficient flexibility. Thus, the yielding point is often reached by the spring. In addition, the hysteresis that exists in metals impairs the stability of spring pretension.

Bending spring elements have also been produced in precision engineering and micromechanics from silicon single-crystal wafers by anisotropic etching and the etching resist technique. In most cases (e.g. pendulums) a strip of constant but freely selectable width, length and depth is etched into the wafer material transverse to the pendulum direction. The width, length and depth of the etching strip determine the accuracy of the location of the fulcrum of the pendulum and, thus, the pendulum length, the spring constant of the flexible pendulum joint and the transverse axis rigidity of the pendulum. The etching strip of such a bending spring joint may, as a result of the position of the crystal axes, represent, in cross section, for example a trapezoidal valley, the bottom of which runs parallel to the rear wafer area. Such a prior art joint is illustrated in FIG. 1 of the drawings.

This prior art leaves something to be desired for high precision pendulum suspensions in the case of both metal springs and bending springs produced by micromechanical etching. While an etched spring does not encounter the hysteresis problems of metal springs, the position of the pendulum fulcrum in the case of bending spring elements formed of silicon single crystal material is often not defineable with sufficient accuracy and the transverse axis rigidity is insufficient. As a result, pendulum joint resonances are too low.

SUMMARY AND OBJECTS OF THE INVENTION

It is therefore the object of this invention to provide a micromechanical bending spring joint of greater accuracy of fulcrum location, higher spring constant and transverse axis rigidity than that attained by existing bending spring joints of metal or selectively etched (silicon) wafer fabrication.

The foregoing and other objects are attained by the present invention that provide, in a first aspect, a pendulum device. Such device includes a generally t-shaped pendulum and a pendulum fastening device. The pendulum and the pendulum fastening device are formed from a wafer. The pendulum is joined to the pendulum fastening device by means of two homologous micromechanical bending spring joints comprising a pair of leaf springs arranged alongside each other and at oblique angles with respect to the major surfaces of the wafer. The pendulum is selectively etched from a single wafer.

In another respect, the invention provides a a pendulum device that includes a generally t-shaped pendulum and a pendulum fastening device. The pendulum and the pendulum fastening device are formed from a generally-planar wafer. The pendulum is joined at the pendulum fastening device by means of two homologous micromechanical bending spring joints comprising a pair of leaf springs so arranged alongside each other and at oblique angles with respect to the major surfaces of the wafer as to cross in a plane perpendicular to the plane of the wafer. The pendulum device is selectively etched from a single wafer.

The foregoing features and advantages of the invention will become further apparent from the detailed description that follows. This description is accompanied by a set of drawing figures. Numerals of the figures, corresponding to those of the written description, point to the features of the invention, like numerals referring to like features throughout.

BRIEF DESCRIPTION OF THE DRAWINGS

FIG. 6 is a perspective view of a pendulum formed in accordance with the micromechanical method of the invention and incorporating two bending spring joints in accordance with the invention for the pendulum suspension.

DETAILED DESCRIPTION

In the invention the position of the axes of the silicon crystal are suitably chosen relative to the wafer area for etching strips or grooves (V-shaped in cross-section) to a desired depth transverse to the desired pendulum direction. By etching two such V-shaped grooves from both sides of the wafer, with a suitable offset, by anisotropic etching and etching resist employing doping by photolithographic methods or ion implantation, one may produce a leaf spring that runs obliquely to the wafer area (as shown in FIG. 2).

Figure 2:
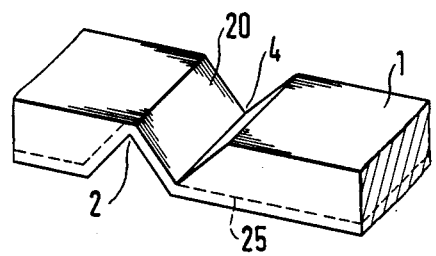
FIG. 2 is a perspective view of a micromechanical bending spring joint component in accordance with the invention.
Figure 3:
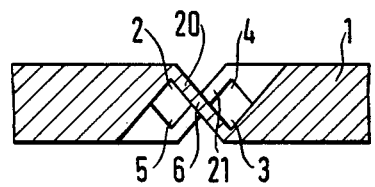
FIG. 3 is a side sectional view of a micromechanical bending spring joint in accordance with the invention.

Turning now to the drawings, FIG. 2 is a perspective view of a component of a bending spring joint of the invention. Such a joint is formed from wafer material, such as single-crystal silicon, by making V-shaped grooves 2 and 4 on either side of the wafer and providing an inclined wall area 20 there between. When employing a selective etching technique, the V-shaped grooves 2, 4 may be produced by suitable positioning of the crystal axes of the single-crystal silicon relative to the wafer area. As shown, the V-shaped grooves 2, 4 are offset with regard to their transverse directions and the wall area 20 that forms the bending spring joint remains when suitable known etching resist techniques are used. The thickness of the wall area 20 (of the leaf spring) may be determined, to very close tolerances by, for example, timed boron doping from a side of the leaf. The doping of inclined surfaces may, for example, be carried out by ion implantation techniques known to those skilled in the art.

Figure 5:
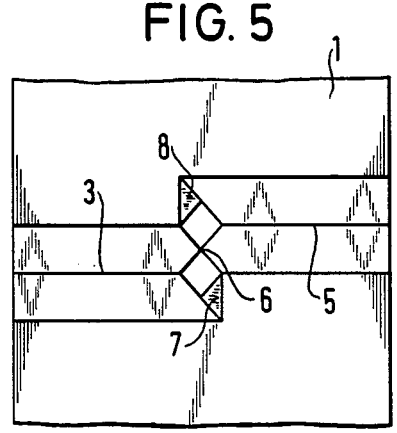
FIG. 5 is a top plan view of the bending spring joint of the preceding figure.

FIGS. 3 through 6 illustrate a exemplary embodiment of a bending spring joint in accordance with the invention. The joint comprises two crossing partitions 20 and 21 forming leaf springs between the pairs of grooves 2, 4 and 3, 5. The V-shaped grooves 3,5 are formed mutually offset in the transverse direction in a first (upper) major surface of the wafer 1 and the opposite V-shaped grooves 2, 4, are formed mutually offset in the transverse direction by the same amount in the other (underside) major surface by means of selective anisotropic etching. The wall area 20 (leaf spring) remains between the grooves 2 and 3 while the wall area 21 (leaf spring) remains between the grooves 4 and 5 as the above-mentioned etching resist technique is employed. The two crossing leaf springs, in combination, form a single bending spring joint of the invention. Due to the position of the crystal axes, slopes 7 and 8 result at the region of intersection between the crossing leaf springs. Depending upon the choice of etch mask dimensions, either a connection or a complete separation may exist between the leaf springs or spring leaves (i.e. the walls 20 and 21) at the point of intersection 6. Difficulty in separating leaf springs due to the inclined positions of the faces 7 and 8 (attributable to etching technique and crystal physics) may be avoided, as seen in FIGS. 5 and 6, by special dimensioning of the etch mask shape. Alternatively known ion etching techniques may be employed for this purpose.

Figure 1:
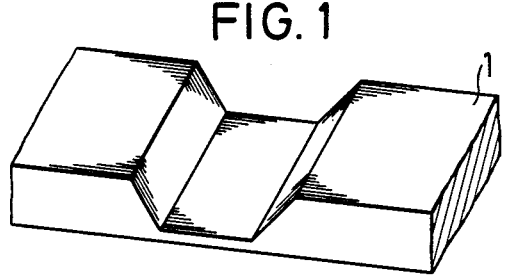
FIG. 1 is a perspective view of a prior art micromechanical bending spring joint formed by selective etching and etching resist from wafer single-crystal material.
Figure 4:
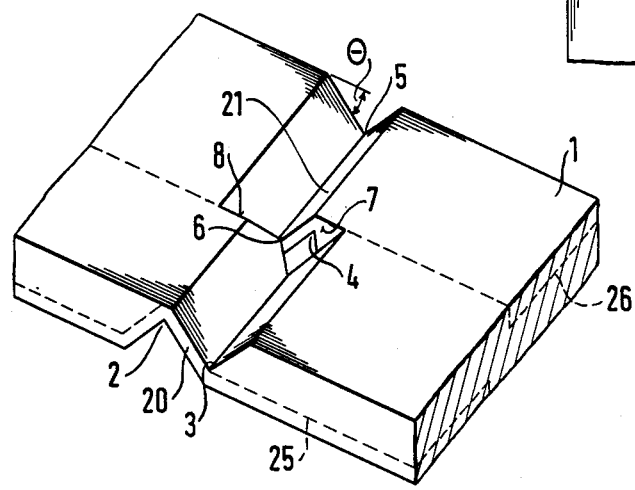
FIG. 4 is a perspective view of a micromechanical bending spring joint in accordance with the invention.

In FIG. 4, the angle $\theta$ (=54.74 degrees) is indicated for the slope that forms the V-shaped grooves. This value is dictated by crystal physics and thus applies to all illustrated embodiments including the prior art of FIG. 1. Additionally, the reference numeral 25 of FIG. 2 points to a broken line that illustrates the application of boron doping to control the depths of the grooves 2 and 4 with very good reproduceability. Corresponding doping layer markings are indicated in FIG. 4 by the reference numerals 25 and 26.

The sloped regions 7, 8 (FIGS. 4 and 5) are undoped ("soft" in terms of etching) to attain etching separation between the two partitions 21, 22 (spring leaves). At present, the most advantageous way to separate the spring leaves is a vertical cut by the ion etching technique (FIG. 5).

FIG. 6 illustrates an advantageous application of a bending spring joint in accordance with the invention on a micromechanical pendulum The pendulum device is denoted generally by reference numeral 10. The actual T-shaped pendulum 12 designed in the manner of a beam, is connected directly to a pendulum suspension 11, by two cross-spring pendulum joints 13, 14 according to the invention. The two cross-spring pendulum joints 13, 14 are spaced apart and, in the example, located at the respective distal ends of the cross-beam of the T-shaped pendulum 12.

The suspension of the T-shaped pendulum 12 by the cross-spring pendulum joints 13, 14 is advantageous in that, unlike the case of a single bending spring joint, any asymmetry that may arise in the direction of the pendulum fulcrum as a result of the position of the two crossed leaf springs is rectified if two (or more) pairs of cross-spring pendulum joints are employed alongside each other in the direction of the fulcrum, positioned homologously relative to one another.

The suspension at two or more parallel cross spring joints, including the pendulum 12 and the suspension 11 or fastening device, may be fabricated as a coherent flexible pendulum joint from a single silicon wafer in one operating sequence. As can be seen, the cross-spring pendulum joints 13, 14 are positioned homologously relative to each other with respect to the pendulum direction.

A pendulum suspension formed by means of two bending spring joints according to the invention which are arranged homolgously with respect to each other is advantageous over known pendulum suspensions which, on the one hand, possess a very low natural frequency of angular deflection while, on the other hand, ensure a very high translatory natural frequency. In such an arrangement, the crossing leaf springs are subject to translatory loading and are subjected, in pairs, to tension and to compression. For example, the translatory natural frequency of conventional leaf spring elements is about 5 kHz, while the corresponding (typical) values for a pendulum with bending spring joints according to the invention are around 20 kHz or more. Moreover, spring elements according to the invention are virtually free from or possess very low hysteresis in comparison with bending spring joints of conventional design.

Thus it is seen that the present invention provides a micromechanical bending spring joint of greater accuracy with regard to fulcrum location, higher spring constant and transverse axis rigidity than that attained by existing bending spring joints of metal or selectively etched (silicon) wafer fabrication.

A micromechanical bending spring joint of selectively etched wafer material is characterized according to the invention by two leaf springs arranged alongside each other which cross and run obliquely relative to the major surfaces of the wafer. The leaf springs are obtained in one piece by selective etching.

The crossing leaf springs may be interconnected at the point of intersection. Alternatively, by choosing etch masks of suitable shape, the two crossing spring leaves may be made to lie freely alongside each other without material interconnection. Such absence of connection is attained by means of the etching process and suitable doping processes and additional processing methods are not required.

The method for producing a bending spring joint with high precision with respect to fulcrum position, high bending spring constant and transverse axis rigidity from a silicon wafer by a selective etching utilizes the co-ordinated two-sided etching of the silicon wafer to form two crossing leaf spring elements. The leaf spring elements are produced by two V-shaped grooves arranged alongside each other and mutually offset in the transverse direction. The grooves are, in each case, made by anisotropic selective etching of the two major surfaces of the silicon wafer. The crossing leaf springs are formed by inclined partitions produced between the V-shaped grooves on one side of the wafer and those on the other side during etching. Spring leaf thickness is controlled by the etching resist technique. Boron may be used as an etching resist agent in a known way for selectively doping into at least one side of the spring leaf or the wafer to determine spring leaf thickness. The separation of the crossing spring leaves in the region of intersection may be achieved by ion etching. Alternatively, an etch mask of special shape may be used for this purpose.

A particularly advantageous application of a bending spring joint according to the invention is in a pendulum produced in one piece from a wafer with a suspension or fastening device. At least one bending spring joint in accordance with the invention (preferably two such joints spaced apart) is arranged in the joining region between the pendulum suspension and the pendulum body.

While the invention has been described with reference to its presently preferred embodiments, it is not limited thereto. Rather, the scope of the invention is only limited insofar as defined by the following set of claims and includes all equivalents thereof.

What is claimed is:

1. A pendulum device comprising in combination:
   (a) a generally T-shaped pendulum;
   (b) a pendulum fastening device;
   (c) said pendulum and said pendulum fastening device being formed from a wafer;
   (d) said pendulum being joined to said pendulum fastening device by means of two homologous micromechanical bending spring joints comprising a pair of leaf springs arranged alongside each other and at oblique angles with respect to the major surfaces of said wafer; and
   (e) said pendulum device being selectively etched from a single wafer.

2. A pendulum device as defined in claim 1 further characterized in that said wafer is of silicon.

3. A pendulum device comprising, in combination:
   (a) a generally T-shaped pendulum;
   (b) a pendulum fastening device;
   (c) said pendulum and said pendulum fastening device being formed from a generally-planar wafer;
   (d) said pendulum being joined at said pendulum fastening device by means of two homologous micromechanical bending spring joints comprising a pair of leaf springs so arranged alongside each other and at oblique angles with respect to the major surfaces of said wafer as to cross in a plane perpendicular to the plane of said wafer; and
   (e) said pendulum device being selectively etched from a single wafer.

4. A pendulum device as defined in claim 3 further characterized in that said wafer is of silicon.

* * * * *